Patented June 22, 1948

2,443,613

UNITED STATES PATENT OFFICE 2,443,613

POLYETHYLENE ISOPROPYLENE SEBACATE ADHESIVE COMPOSITIONS AND METHODS AND ARTICLES UTILIZING THEM

Calvin S. Fuller, Chatham, N. J., assignor to Bell Telephone Laboratories, Incorporated, New York, N. Y., a corporation of New York No Drawing. Application October 23, 1943, Serial No. 507,484

6 Claims. (Cl. 154—140)

This invention relates to adhesives, to articles embodying these adhesives, and to methods of employing these adhesives.

Few materials are available having the pressure sensitive adhesive properties and the other desirable properties of natural rubber cements. The present invention is based primarily upon the discovery that solutions of the unvulcanized, synthetic, substantially non-crystalline, high molecular weight polymers, known as the paracons, possess many of the desirable characteristics of natural rubber cements and in addition possess other desirable properties as adhesives. The invention in its broader aspects is concerned with the use of paracons, and with the use of similar polymers of a higher degree of crystallinity, as adhesives generally.

The paracons are extremely viscous liquids, which at room temperatures have a consistency somewhat similar to that of milled crepe rubber, or else they are somewhat flexible, rubbery solids of slight crystallinity which melt readily at temperatures up to about 20° C. above room temperature to form viscous liquids of a consistency similar to the normally liquid polymers. These latter substances possess sufficient flexibility, being largely amorphous, to be milled directly on cold rolls, where they are almost instantly reduced to a viscous liquid state by the temperature rise induced by milling. Similar substances of a higher degree of crystallinity may be used for some of the purposes of the present invention as described below.

The paracons may be strictly linear polyesters of high molecular weight containing no non-benzenoid carbon-to-carbon unsaturation, which are prepared by the superesterification of a glycol with a dicarboxylic acid or of a hydroxy acid with itself in a manner similar for instance to that described for crystalline polymers in U. S. Patents 2,071,250 and 2,249,950. They may also be polyesters which are essentially similar but which contain limited amounts of olefinic or non-benzenoid unsaturation. These partially unsaturated polyesters may be prepared in the same manner as the fully saturated polymers, except that one or more of the ingredients of the reaction mixture from which they are prepared contains a properly limited amount of unsaturated carbon-to-carbon bonds. These substances are more particularly described and claimed in the copending application of C. S. Fuller, Serial No. 485,202, filed April 30, 1943.

Since the paracons and the more crystalline polyesters are soluble in most strong organic solvents such as esters, aromatic hydrocarbons, or chlorinated hydrocarbons, the cement solutions of the present invention can be made up of solutions of the adhesive material and these solvents. Chloroform and benzene are particularly useful solvents. Solutions may be formed by tumbling the polymer in the appropriate solvent.

The resulting solutions are viscous and resemble natural rubber cements. The concentration of polymers employed will depend upon the viscosity of the cement desired. Solutions containing 5 per cent by weight of polymer are ordinarily suitable. However, any solution containing from about one per cent by weight of the polymer up to the maximum amount of polymer which will dissolve will be suitable for the purposes of the present invention.

In general, for use on the more porous bases, such as paper, benzene solutions of the polymer are to be preferred to chloroform solutions since the chloroform solutions tend to soak in excessively. Those polyesters formed from glycols and dicarboxylic acids having the longer hydrocarbon chains, such as sebacic acid, are more soluble in hydrocarbon solvents than are the polyesters prepared from the shorter chain glycols and dicarboxylic acids, such as succinic acid. Therefore, when benzene is used as the solvent, the sebacates are to be preferred to the succinates.

The cements of the present invention may be used like natural rubber cement for joining various substances, such as paper, cloth, regenerated cellulose, cellulose derivatives, wood, glass, metal, vulcanized paracon rubbers, natural and synthetic rubbers, and the various synthetic resins, by forming a thin film of the cement on the surfaces to be joined and allowing the solvent to evaporate. The resulting polyester coating has properties resembling those of natural rubber cements. Two such coated surfaces will readily adhere to one another but will not stick to any great degree to the fingers or to the majority of uncoated surfaces. Upon drying, the film of polyester can be rolled up by rubbing with the finger in the same manner as natural rubber cements.

Because of their pressure sensitive properties, the adhesives of the present invention may be used for forming articles, such as self-sealing envelopes, in which both the flap and the portion of the body of the envelope to which the flap is to be sealed are coated with the adhesive. The present invention is also applicable to the manufacture of all other articles requiring pressure sensitive adhesives.

The properties of the cements described above may be varied somewhat by varying the composition of the polyesters employed. Those polyesters which are permanently gummy, non-crystalline substances at room temperatures will permanently retain their pressure sensitive adhesive characteristics. Examples of such polyesters are polyisopropylene sebacate, polyisopropylene succinate, polydiethylene succinate, polyisopropylene sebacate maleate (98 mol per cent sebacate, 2 mol per cent maleate) and polyisopropylene succinate maleate (98 mol per cent succinate, 2 mol per cent maleate).

Additionally advantageous properties may be obtained by employing those polyesters which are normally slightly crystalline at room temperatures. Examples of such polyesters are polyethylene isopropylene sebacate (20 mol per cent ethylene, 80 mol per cent isopropylene), polyethylene isopropylene succinate (50 mol per cent ethylene, 50 mol per cent isopropylene), polyethylene isopropylene sebacate maleate (20 mol per cent ethylene, 80 mol per cent isopropylene, 98 mol per cent sebacate, 2 mol per cent maleate), polyethylene isopropylene succinate maleate (50 mol per cent ethylene, 50 mol per cent isopropylene, 98 mol per cent succinate, 2 mol per cent maleate).

These normally slightly crystalline polyesters ordinarily require a considerable length of time to crystallize at room temperatures when deposited in the amorphous, supercooled state from either the molten state or from solution. Therefore, a film of this type of polyester, deposited from a cement solution as described above, will possess pressure sensitive adhesive properties for a period of time dependent in general upon the normal degree of crystallinity of the substance. Thereafter, the polymer will crystallize to a flexible, solid, dry, rubbery, non-tacky state. Therefore, an adhesive bond formed by virtue of the pressure sensitive adhesive properties during the amorphous period will later become strong and permanent through the crystallization of the polymer.

A film of this type of polyester, which has become non-tacky through crystallization, may be restored to the state in which it will function as a pressure sensitive adhesive by heating above its melting point and cooling to room temperature. For uses where advantage cannot be taken of the adhesive properties immediately after the film is deposited from solution, as in the self-sealing envelopes referred to above, these polyesters may nevertheless be employed by utilizing the heat of the hand or some other source of heat to reduce the polyesters to a tacky state.

Not only the moderately crystalline polyesters but even the more highly crystalline polyesters, such as polyethylene succinate or polyethylene succinate maleate (less than 10 mol per cent maleate) and polyesters possessing any intermediate degree of crystallinity, can be made to function in this manner if advantage is taken of the tack of these substances immediately after they are reduced to amorphous films at room temperature. Although these substances crystallize more rapidly than the less crystalline substances, there is nevertheless a useful interval during which the polymer remains in the amorphous state at room temperature. Polyesters of this type, which contain unsaturation, are more particularly described and claimed in the copending application of C. J. Frosch, Serial No. 401,957, filed July 11, 1941, now abandoned.

The strength of the films deposited from the various polyester solutions described above may be improved in some instances by incorporating in the cement solutions a small amount of a polymerizable olefinic or vinyl compound as, for instance, styrene, diallyl phthalate, divinyl benzene, methyl methacrylate or vinyl acetate. Ordinarily an amount of polymerizable olefinic or vinyl compound in the vicinity of about 2 per cent by weight of the cement will be suitable. An example of such a cement is a benzene solution containing 5 per cent by weight of polyisopropylene sebacate maleate (2 mol per cent maleate) and 2 per cent by weight of monomeric methyl methacrylate. The monomeric compound polymerizes slowly in the film under the influence of atmospheric oxygen to increase the strength and permanence of the adhesive bond. If desired, a small amount of a polymerization catalyst, such as benzoyl peroxide, may be added to such adhesive solutions just before they are used.

The solid substantially crystalline polyester materials may be used as adhesives in various other ways as, for example, by placing them in sheet form between bodies having roughened surfaces, such as cloth, and applying heat sufficient to melt the polyesters. Adhesive tapes may be formed by mixing the permanently non-crystalline polyesters with sticky natural or synthetic resins and applying them to cloth, paper, regenerated cellulose, or other flexible sheet material.

As indicated above, polyesters for the purposes of the present invention may be prepared by the esterification of a glycol with a dicarboxylic acid or by the autoesterification of a hydroxy acid under conditions such as to produce a high degree of linear molecular growth. In order to function satisfactorily for the adhesive purposes of the present invention, it is necessary that the linear polyesters containing no carbon-to-carbon unsaturation possess a degree of linear molecular growth as indicated by a weight average molecular weight of more than 10,000 (as determined from viscosity measurements by the Staudinger equation). For best results the weight average molecular weight of these polyesters should exceed 20,000. Polyesters containing carbon-to-carbon unsaturation should have an equivalent degree of linear growth, as indicated by essentially non-cyclic ester chains and a degree of esterification of at least 98 per cent.

The degree of crystallinity or non-crystallinity of the polyesters, the importance of which was referred to above, is determined by the molecular structure of the ingredients from which the polyester is prepared as well as by the degree of order within the polyester molecules.

Polyesters derived by the esterification of polymethylene glycols with polymethylene dicarboxylic acids or by the esterification of polymethylene monohydroxy monocarboxylic acids are, with the exception of those produced from trimethylene glycol and glutaric acid, the most highly crystalline polyesters which have been produced. As the molecular structure departs from this straight chain polymethylene arrangement, as for instance by the introduction of side chain substituents, hetero-atoms or unsaturated carbon-to-carbon bonds, the polyesters become less crystalline. The presence of aromatic rings also in general reduces the crystallinity.

Therefore, polyesters prepared by reacting glycols with dicarboxylic acids, where either one of the constituents has frequently occurring or large side chains, or contains large amounts of non-benzenoid unsaturation or aromatic rings or hetero-atoms in the linear chain, are usually non-crystalline. However, if the other member of the reaction mixture is a polymethylene glycol or a polymethylene dicarboxylic acid, the crystallizing tendencies of the polyester increases as the length of the polymethylene chain increases. Thus dihydromuconic acid forms a non-crystalline polyester with ethylene glycol but a crystalline polyester with decamethylene glycol. Diethylene glycol forms a non-crystalline polyester with succinic acid but a crystalline polyester with sebacic acid.

Among the alkyl substituted polymethylene glycols, the most available is isopropylene glycol, or methylethylene glycol. This glycol forms non-crystalline polyesters with polymethylene dicarboxylic acids between succinic acid and sebacic acid. Polyisopropylene succinate does not become highly crystalline when as much as 50 or 60 per cent of the isopropylene glycol is replaced by ethylene glycol. With isopropylene sebacate, however, no more than about 30 per cent of ethylene glycol can be substituted for the isopropylene glycol without inducing a substantially high degree of crystallization.

Although dicarboxylic acids containing conjugated unsaturation, such as maleic or fumaric acid, form non-crystalline polyesters with the common polymethylene glycols, they are ordinarily used in such small concentrations that their effect upon the crystallinity is not great.

The most readily available of the non-crystalline polyester forming reactants containing hetero-atoms are diethylene glycol and diisopropylene glycol. Diglycolic acid is also of some interest as a hetero-atom containing compound. The most available of the aromatic ring containing reactants is phthallic acid.

Trimethylene glycol and glutaric acid, both of which contain three methylene groups between their functional end groups, form polyesters, with the shorter chain polymethylene glycol and polymethylene dicarboxylic acids, which crystallize exceedingly slowly. Therefore polyesters formed from these substances are useful as pressure sensitive adhesives.

Another factor influencing crystallinity, aside from the molecular structure of the individual constituents, is the degree of order in the polyester molecules. The most ordered molecules having the most regular polar group spacing, all other factors being equivalent, are the most crystalline. Thus, the greater the number of glycols and the greater the number of dicarboxylic acids or the greater the number of hydroxy acids used in preparing the polyester, the less will be the tendency to crystallize. In a polyester prepared from ethylene glycol and equimolar amounts of sebacic and succinic acids, or similar polyesters in which maleic acid is substituted for portions of the succinic acid, the disorder imparts substantial noncrystallinity.

By application of the principles set forth above, polyesters having any degree of crystallinity desired for the intended purpose may be produced.

In general only those polymers which are viscous, liquid, non-glassy substances in their amorphous state at room temperatures are useful as pressure sensitive adhesives. Therefore the polyesters prepared from a glycol and phthalic acid alone, which are glassy, are ordinarily not suited for this purpose. However, when the phthalic acid is diluted sufficiently with an aliphatic acid to produce polyesters which are non-glassy viscous liquids in their amorphous state at room temperatures, these polyesters are useful pressure sensitive adhesives.

Although the invention has been described in terms of its specific embodiments, certain modifications and equivalents will be apparent to those skilled in the art and are intended to be included within the scope of the invention which is to be limited only by the reasonable scope of the appended claims.

What is claimed is:

1. The method of bonding two surfaces of flexible sheet material which comprises coating the surfaces to be bonded at substantially room temperature with a benzene solution containing at least 1 per cent by weight of polyethylene isopropylene sebacate wherein the ethylene residue constitutes about 20 mol per cent of the total ethylene and isopropylene residues, said polyester having a weight average molecular weight above about 10,000, allowing substantially all the solvent to evaporate whereby a non-crystalline, tacky, gummy film of the polyester is formed on the surfaces to be joined, and pressing the surfaces firmly together at substantially room temperature, while the polyester is in the non-crystalline gummy state.

2. The method of bonding two solid surfaces which comprises forming on said surfaces a coating of polyethylene isopropylene sebacate in a noncrystalline, tacky, gummy state, said polyester having a weight-average molecular weight greater than 10,000, and pressing together said surfaces at substantially room temperature, while the polyester is in the noncrystalline, gummy state.

3. The method described in claim 2 wherein the ethylene residue of the polyethylene isopropylene sebacate constitutes not more than 30 per cent of the total ethylene and isopropylene residues.

4. A flexible sheet material having on at least a portion of its surface an adhesive coating comprising polyethylene isopropylene sebacate in a non-crystalline, tacky, gummy state, said polyester having a weight average molecular weight above about 10,000.

5. The article described in claim 4, wherein the ethylene residue of the polyester constitutes about 20 mol per cent of the total ethylene and isopropylene residues.

6. A cement capable of forming a pressure sensitive adhesive coating comprising a benzene solution of polyethylene isopropylene sebacate having a weight average molecular weight above about 10,000, the ethylene residue of said polyester constituting not more than 30 mol per cent of the total ethylene and isopropylene residues.

CALVIN S. FULLER.

REFERENCES CITED

The following references are of record in the file of this patent:

UNITED STATES PATENTS

| Number | Name | Date |
|---|---|---|
| 2,012,267 | Carothers | Aug. 27, 1935 |
| 2,071,251 | Carothers | Feb. 16, 1937 |
| 2,191,367 | Carothers | Feb. 20, 1940 |
| 2,195,362 | Ellis | Mar. 26, 1940 |
| 2,249,950 | Fuller | July 22, 1941 |
| 2,260,024 | Hall et al. | Oct. 21, 1941 |
| 2,268,616 | Peters | Jan. 6, 1942 |

FOREIGN PATENTS

| Number | Country | Date |
|---|---|---|
| 116,140 | Australia | Nov. 26, 1942 |